United States Patent
Udagawa et al.

(10) Patent No.: US 8,355,163 B2
(45) Date of Patent: Jan. 15, 2013

(54) APPARATUS AND METHOD FOR PERFORMING GRADATION ADJUSTMENT OF A DISPLAY IMAGE

(75) Inventors: Hiroshi Udagawa, Tokyo (JP); Masato Nakamura, Kanagawa (JP); Kohei Nojiri, Saitama (JP); Mitsugu Ishihara, Kanagawa (JP); Soichi Kuwahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 462 days.

(21) Appl. No.: 11/251,228

(22) Filed: Oct. 14, 2005

(65) Prior Publication Data

US 2006/0103901 A1 May 18, 2006

(30) Foreign Application Priority Data

Oct. 18, 2004 (JP) .................... 2004-303598

(51) Int. Cl.
*H04N 1/60* (2006.01)

(52) U.S. Cl. ....... 358/1.9; 358/1.13; 358/1.15; 358/521; 382/162; 382/164

(58) Field of Classification Search .............. 358/1.15, 358/521, 527
See application file for complete search history.

(56) References Cited

U.S. PATENT DOCUMENTS

| | | | | |
|---|---|---|---|---|
| 5,844,689 A * | 12/1998 | Kawase | | 358/296 |
| 5,937,232 A * | 8/1999 | Taguchi et al. | | 399/81 |
| 6,002,842 A * | 12/1999 | Oshio et al. | | 358/1.9 |
| 6,701,011 B1 * | 3/2004 | Nakajima | | 382/167 |
| 6,765,691 B2 * | 7/2004 | Kubo et al. | | 358/1.9 |
| 6,947,158 B1 * | 9/2005 | Kitamura et al. | | 358/1.15 |
| 6,965,462 B1 * | 11/2005 | Henderson et al. | | 358/504 |
| 7,023,578 B2 * | 4/2006 | Hayes et al. | | 358/1.9 |
| 7,113,310 B2 * | 9/2006 | Morikawa | | 358/3.1 |
| 7,206,445 B2 * | 4/2007 | Takemoto | | 382/162 |
| 7,251,054 B2 * | 7/2007 | Takemoto | | 358/1.9 |
| 7,292,369 B2 * | 11/2007 | Yokoyama et al. | | 358/1.9 |
| 7,405,717 B2 * | 7/2008 | Baba et al. | | 345/89 |
| 7,428,011 B1 * | 9/2008 | Hyodo et al. | | 348/231.6 |
| 7,446,900 B2 * | 11/2008 | Kise | | 358/1.9 |
| 7,483,187 B2 * | 1/2009 | Bochkarev | | 358/519 |
| 7,551,205 B2 * | 6/2009 | Kubo et al. | | 348/222.1 |
| 7,557,964 B2 * | 7/2009 | Smith et al. | | 358/406 |
| 2002/0085234 A1 * | 7/2002 | VanDuyn et al. | | 358/3.06 |
| 2003/0035127 A1 * | 2/2003 | Nakami | | 358/1.9 |
| 2003/0164973 A1 * | 9/2003 | Hisatomi et al. | | 358/1.15 |
| 2004/0233484 A1 * | 11/2004 | Seko et al. | | 358/523 |
| 2005/0225785 A1 * | 10/2005 | Hiramatsu | | 358/1.9 |
| 2005/0248795 A1 * | 11/2005 | Vorhees | | 358/1.13 |
| 2009/0059257 A1 * | 3/2009 | Kondo et al. | | 358/1.9 |

FOREIGN PATENT DOCUMENTS

| | | |
|---|---|---|
| JP | 2003-046797 | 2/2003 |
| JP | 2003-250122 | 9/2003 |
| JP | 2004-088620 | 3/2004 |

* cited by examiner

*Primary Examiner* — Dung Tran
(74) *Attorney, Agent, or Firm* — Robert J. Depke; Rockey, Depke & Lyons, LLC

(57) ABSTRACT

A printing control device included in an image processing device for displaying an observed image on a display screen, the printing control device including: a printing instruction detecting unit for detecting whether or not there is a printing instruction to print the observed image; and a gradation correction information output control unit for outputting information on gradation correction made temporarily for observation of the observed image to one of a printing device and an external storage medium together with original image data of the observed image when a printing instruction is detected.

17 Claims, 21 Drawing Sheets

FIG. 3

| | GAMMA | |
|---|---|---|
| | GAMMA: CUSTOM | |
| | GAMMA: CURVE A | |
| | GAMMA: CURVE B | |
| | GAMMA: CURVE C | |
| | GAMMA: CURVE D | |

GAMMA CONVERSION

LUMINANCE-TO-DENSITY CONVERSION
+GRADATION CORRECTION MATCHING

P-CURVE(a)
P-CURVE(b)
P-CURVE(c)
P-CURVE(d)

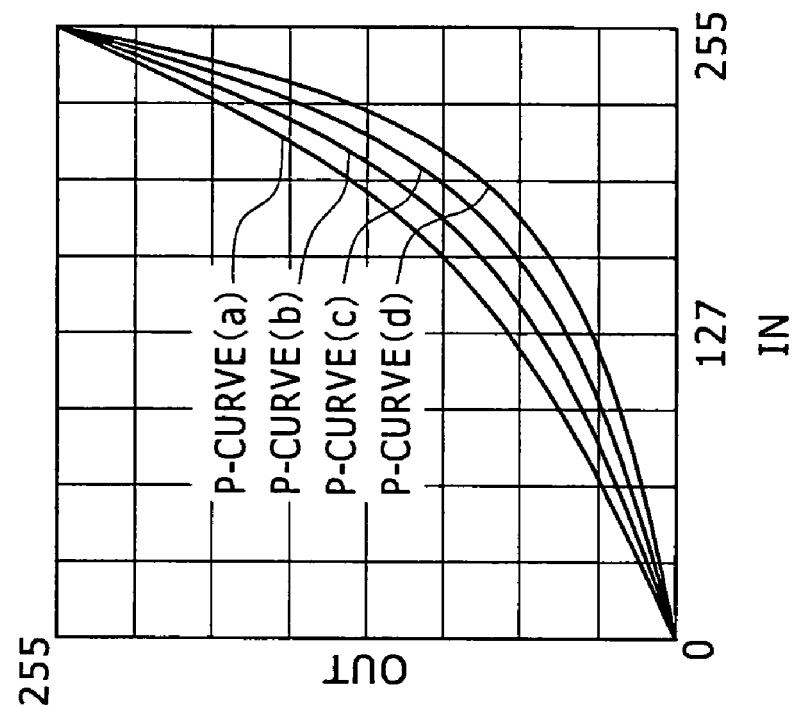
FIG. 19A LUMINANCE-TO-DENSITY CONVERSION
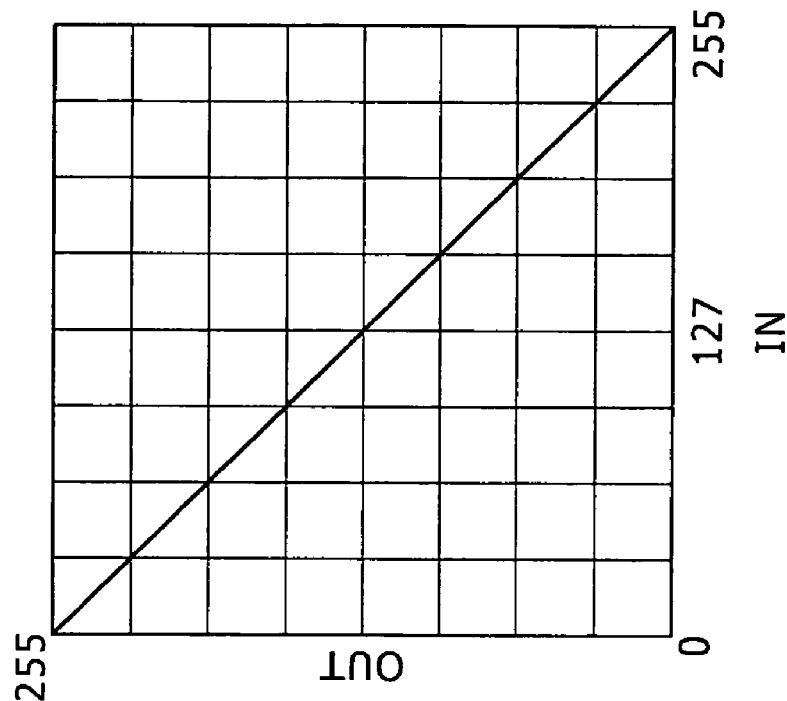
FIG. 19B GRADATION CORRECTION MATCHING +GAMMA CONVERSION

APPARATUS AND METHOD FOR PERFORMING GRADATION ADJUSTMENT OF A DISPLAY IMAGE

The present application claims priority to Japanese Patent Application No. JP2004-303598, filed Oct. 18, 2004; the entire contents of which is incorporated herein by reference.

BACKGROUND OF THE INVENTION

One form of the invention relates to a printing control device incorporated in an image processing device for displaying an observed image on a display screen. One form of the invention relates to an image processing device for displaying an observed image on a display screen. One form of the invention relates to a printing control method performed in an image processing device for displaying an observed image on a display screen. One form of the invention relates to a program executed by a computer included in an image processing device for displaying an observed image on a display screen.

One form of the invention relates to a printing control device included in a printing device. One form of the invention relates to a printing device. One form of the invention relates to a printing control method performed by a printing device. One form of the invention relates to a program executed by a computer included in a printing device.

The conversion of medical information into electronic information has now been under way in medical fields. Accordingly, an environment is being put in order in which an image for medical diagnosis which image is photographed by an electronic photographing device can be observed immediately after photographing.

Images for medical diagnosis include for example X-ray photographed images, MR images, and others. As referred to as "see-through shadows," most of images of this kind are single-color images. In addition, images of this kind do not have stereoscopic shading for providing perceived depth to a subject. Therefore, light and shade represented as a shadow is the only information of images of this kind.

Hence, reproducibility of light and shade information on a display screen or printed matter is important to images for medical diagnosis. That is, reproducibility of gradation of an image is essential for quick diagnosis and accurate diagnosis.

There are cases where the brightness and contrast of an observed image are desired to be changed to observe an affected part or another area of interest displayed on a display device in more detail.

In addition, because a manner in which an observed image is seen on a display screen differs depending on an environment where the display device is installed, for example the brightness of a room or the like, there are cases where the brightness and contrast of the image are desired to be changed for easier observation.

From such necessity, application software has been developed which provides a plurality of gamma characteristics selectable by an observer and thereby enables gradation of the observed image to be changed. Description thereof will be made in more detail.

FIG. 1 shows an example of a typical image printing system. This image printing system includes: an image processing device 1 for processing an observed image; a display device 3 for displaying the observed image; and a printing device 9 for printing image data (printing data) supplied via a communication path 5 or an external storage medium 7.

The communication path 5 may be a wire path or a wireless path, and may be formed via a network. A portable storage medium, for example a semiconductor memory, an optical storage medium, a magnetic storage medium or the like is used as the external storage medium 7.

FIG. 2 shows an example of display of a monochrome image by application software started by the image processing device 1. This application software has a function that enables an observer to change characteristics of gradation reproducibility of an image display system through a user interface. FIG. 3 shows an example of the user interface. In this example, five gamma buttons are provided to allow selection or adjustment of a gradation correction curve.

FIG. 4 shows an example of gradation correction curves (hereinafter referred to also as "gamma correction curves"). The brightness of image display can be changed by correcting original image data by these curves.

In this example, M-Curve (a) produces a darkest image, and M-Curves (b), (c), and (d) produce brighter images in that order. M-Curves (a) to (d) correspond to curves A to D in FIG. 3.

Incidentally, when a custom input is selected on the user interface, an arbitrary curve can be selected by a drag-and-drop operation of a mouse. FIG. 5 shows an example of a gradation correction curve based on a cubic curve function and an example of the user interface.

In general, a display device including a display device of a CRT (Cathode Ray Tube) system does not have a linear proportional relation as a brightness characteristic of an output value with respect to an input value, and has a curved output characteristic specific to the display device, in which the display device starts emitting light gradually at a certain value and then sharply increases a light quantity. This curve is referred to as the "gamma curve of the monitor".

Hence, when image data is supplied to the display device as it is without gradation correction, gradation distortion of a displayed image is inevitable. In practice, however, image data handled by a computer is initially created according to the curve, so that there is no fear of distortion in reproduction characteristics.

FIG. 6 shows a typical gamma curve of a CRT. A curve represented by alternate long and short dashed lines in the figure is an input-output characteristic used as a de facto standard in a computer display. Hence, when a gamma curve specific to a display differs from the de facto standard gamma curve, reproduction characteristics thereof may be adjusted to the de facto standard gamma curve within the computer to maintain compatibility of images and graphic data.

When an image having an opposite tendency from that of this gamma curve is created, characteristics of reproduction of gradation by a brightness output of the CRT can be kept substantially linear in a dark-to-bright range. The tendency of the image data is represented by a broken line in FIG. 6. Gamma-corrected reproduction characteristics are represented by a solid line in FIG. 6.

However, the linearity of the gradation created according to this gamma curve is limited to a case where ambient brightness satisfies a certain precondition.

Hence, when surroundings of the CRT are extremely bright, an observed image is observed as a very dark image, whereas when surroundings of the CRT are extremely dark, an observed image is observed as a very bright image.

Thus, the gradation of an observed image is not maintained in a best state at all times. In fact, depending on an environment in which the display device is installed, a better result may be obtained when there is a difference from the de facto standard gamma correction curve.

Thus, general image display systems do not have an optimum and universal gamma value.

Further, there is another reason for changing the brightness and contrast of the display device displaying an observed image. For example, the brightness and the contrast are changed for easier observation of an affected part or a specific area suspected to be an affected part.

Accordingly, when the brightness and the contrast are changed, characteristics of reproduction of gradation of an observed image need to be changed adaptively.

The above-described application software (FIG. 3) is used to change the gradation reproduction characteristics.

FIG. 7 shows an example of internal configuration of an image printing system (FIG. 1) having a function of changing the gradation reproduction characteristics by the application software.

The image processing device 1 includes an image memory 11, a variable gamma correction unit 13, a fixed gamma correction unit 15, and a printer driver 17.

The variable gamma correction unit 13 corresponds to a brightness correction process by the application software. For example, the variable gamma correction unit 13 performs a correction process using a gamma correction curve selected via the user interface screen shown in FIG. 3. The brightness correction in the variable gamma correction unit 13 is variable.

The fixed gamma correction unit 15 corresponds to a de facto standard gamma correction process. This process is a fixed process for maintaining a characteristic of reproduction of density of the display device at a certain value.

FIG. 8 shows equivalent gamma curves of the system as a whole. As a result of brightness correction made by the gamma curves by the application software, the gradation reproduction characteristics are converted nonlinearly.

[Patent Document 1]
Japanese Patent Laid-Open No. Sho 56-107674
[Patent Document 2]
Japanese Patent Laid-Open No. 2003-259122
[Patent Document 3]
Japanese Patent Laid-Open No. 2004-216559

SUMMARY OF THE INVENTION

Conventionally, it is a common practice to limit the adjustment or change of the gradation reproduction characteristics for observation on the display device to only a temporary change in a display signal processing system. That is, it is a common practice not to update and store a data file of an original image.

Hence, when an observed image is printed, it is a common practice not to reflect a result of brightness correction seen on an application screen in the printed image. In the case of FIG. 7, it is a common practice to read an image to be printed which image is not corrected in brightness from the image memory 11, and supply the image to be printed to the printer driver 17.

The observed image and original image data are handled separately from each other because compatibility of the original image data needs to be maintained between the display device and other devices.

Consequently, however, characteristics of reproduction of gradation of an image (observed image) as a result of display do not match characteristics of reproduction of gradation of an image (printed image) as a result of printing. For example, in a case where an image obtained by photographing an affected part includes such a subtle gradation that a pathological decision is made possible only by a specific brightness correction on an image display device, it is difficult to determine the condition of the affected part when the image is printed on paper or the like by a printing device.

The present inventors direct attention to the above technical problems, and propose the following technical methods.

(A) First Technical Method

There is proposed an image processing device for displaying an observed image on a display screen or a printing control device included in the image processing device, the image processing device or the printing control device including:

(a) a printing instruction detecting unit for detecting whether there is a printing instruction to print the observed image; and (b) a gradation correction information output control unit for outputting information on gradation correction made temporarily for observation of the observed image to one of a printing device and an external storage medium together with original image data of the observed image when a printing instruction is detected.

The information on gradation correction refers to information necessary to match a gamma correction curve on the image processing device side to a gamma correction curve on the printing device side. For example, a gamma value, lookup table data for specifying a gamma curve, a function for generating a gamma curve, an identifier for identifying a gamma curve selected from gamma curves prepared in advance, and the like are used as the information on gradation correction.

(B) Second Technical Method

There is proposed a printing device or a printing control device included in the printing device, the printing device or the printing control device including:

(a) a gradation correction information detecting unit for determining whether or not information on gradation correction made temporarily for observation of an observed image is added to printing data; and (b) a gradation matching unit for, when information on gradation correction is added, matching gradation of a printed image to gradation of the observed image by additionally correcting gradation of the printing data on a basis of the information on gradation correction.

By employing the technical methods according to embodiments of the present invention, it is possible to match gradation reproduction characteristics of an observed image to gradation reproduction characteristics of a printed image to a certain extent even when brightness reproduction characteristics are changed temporarily on a display screen.

BRIEF DESCRIPTION OF THE DRAWINGS

FIG. 3 is a diagram showing an example of a user interface for gradation correction;

FIGS. 19A and 19B are characteristic curve diagrams corresponding to conversion processes performed in the printing device;

DETAILED DESCRIPTION OF THE PREFERRED EMBODIMENTS

Embodiments of image processing devices employing technical methods according to embodiments of the present invention will hereinafter be described.

Incidentally, well known or publicly known techniques in a pertinent technical field are applied to parts not specifically shown or described in the present specification.

The embodiments to be described below are each one embodiment of the present invention, and the present invention is not limited to these embodiments.

(A) Example of Image Printing System

Figure 1:
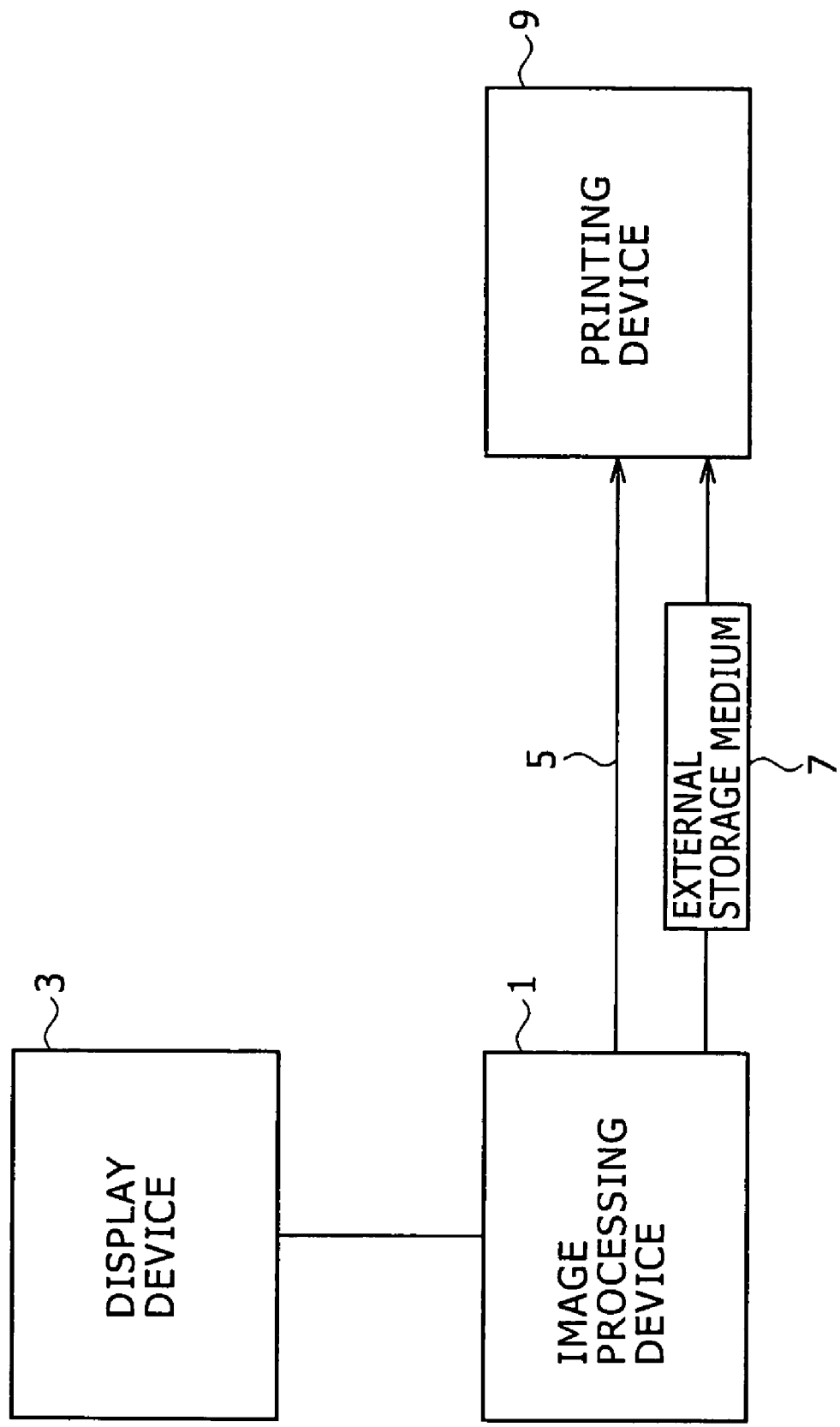
FIG. 1 is a diagram showing an example of configuration of an image printing system.
Figure 2:
FIG. 2 is a diagram showing an example of display of a monochrome image.
Figure 4:
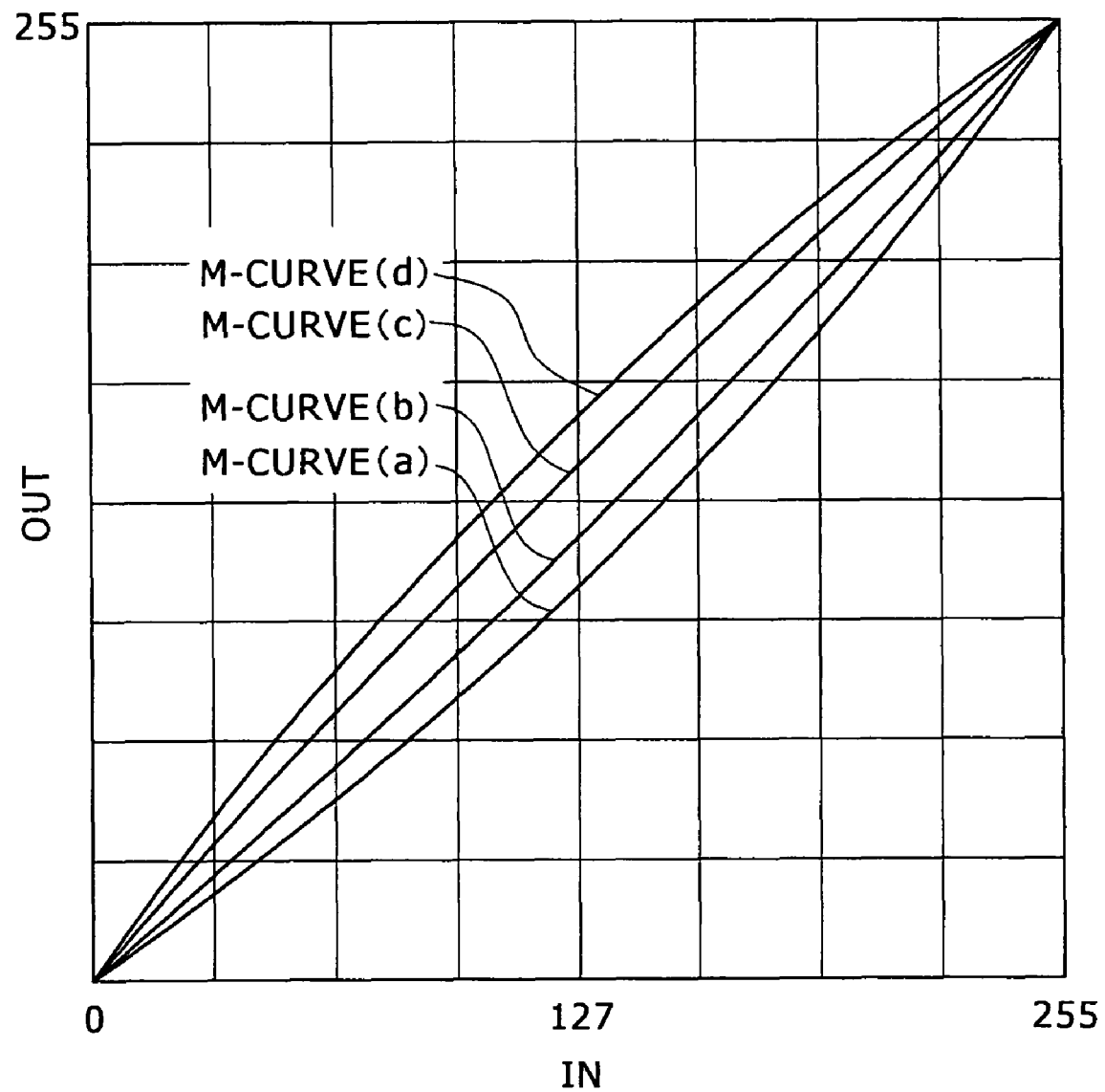
FIG. 4 is a diagram showing an example of selectable gradation correction curves.
Figure 5:
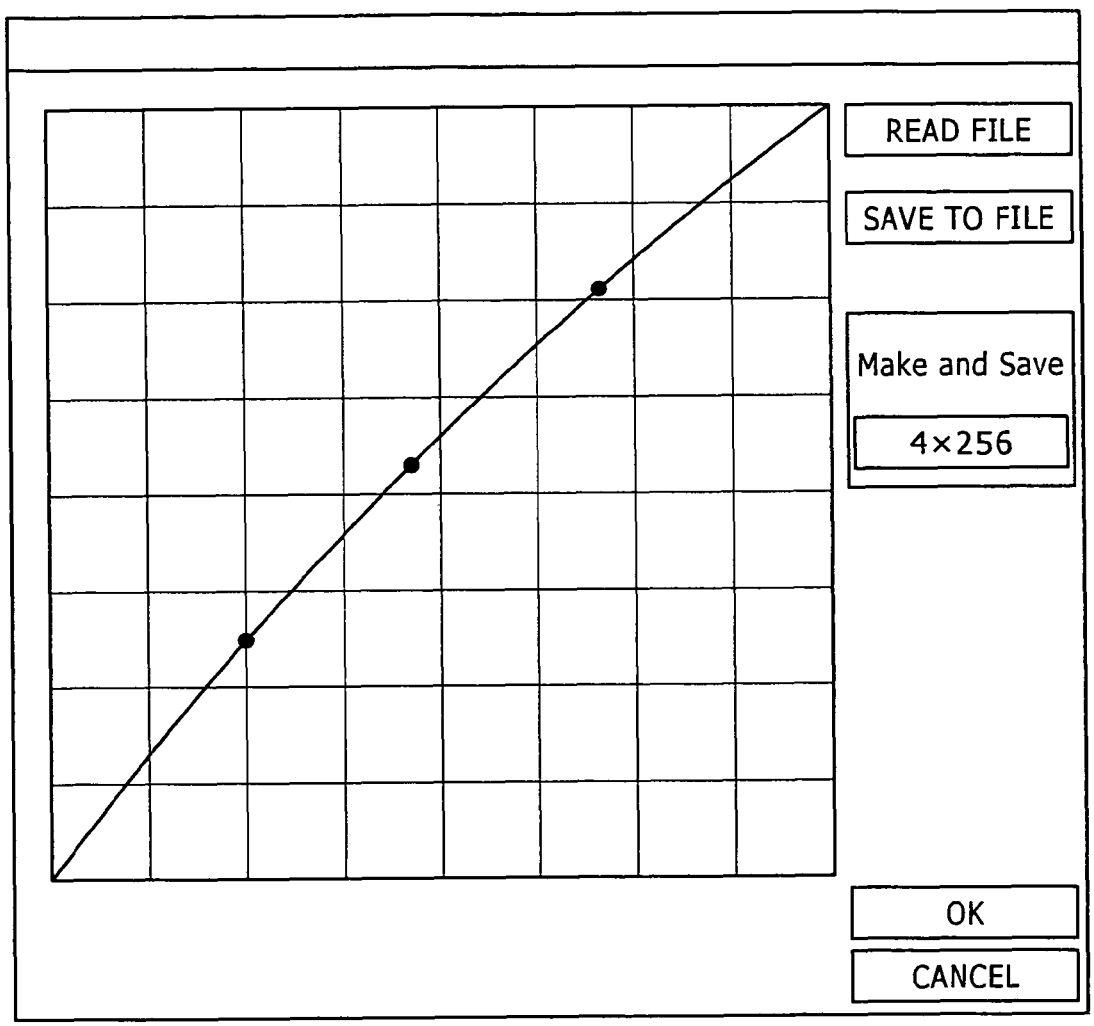
FIG. 5 is a diagram showing an example of a user interface used in creating an arbitrary gradation correction curve.
Figure 6:
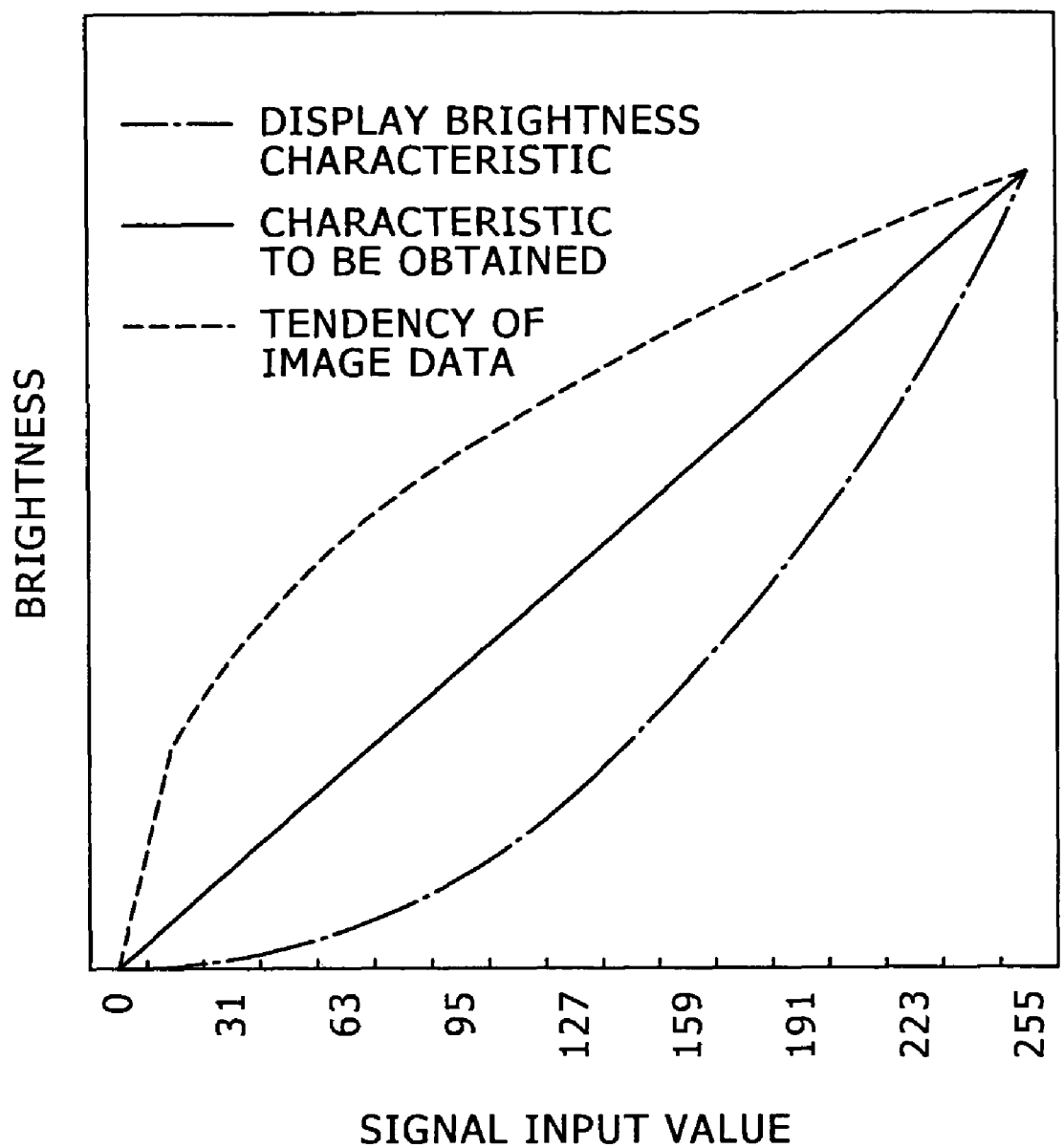
FIG. 6 is a diagram showing a typical gamma curve of a CRT.
Figure 7:
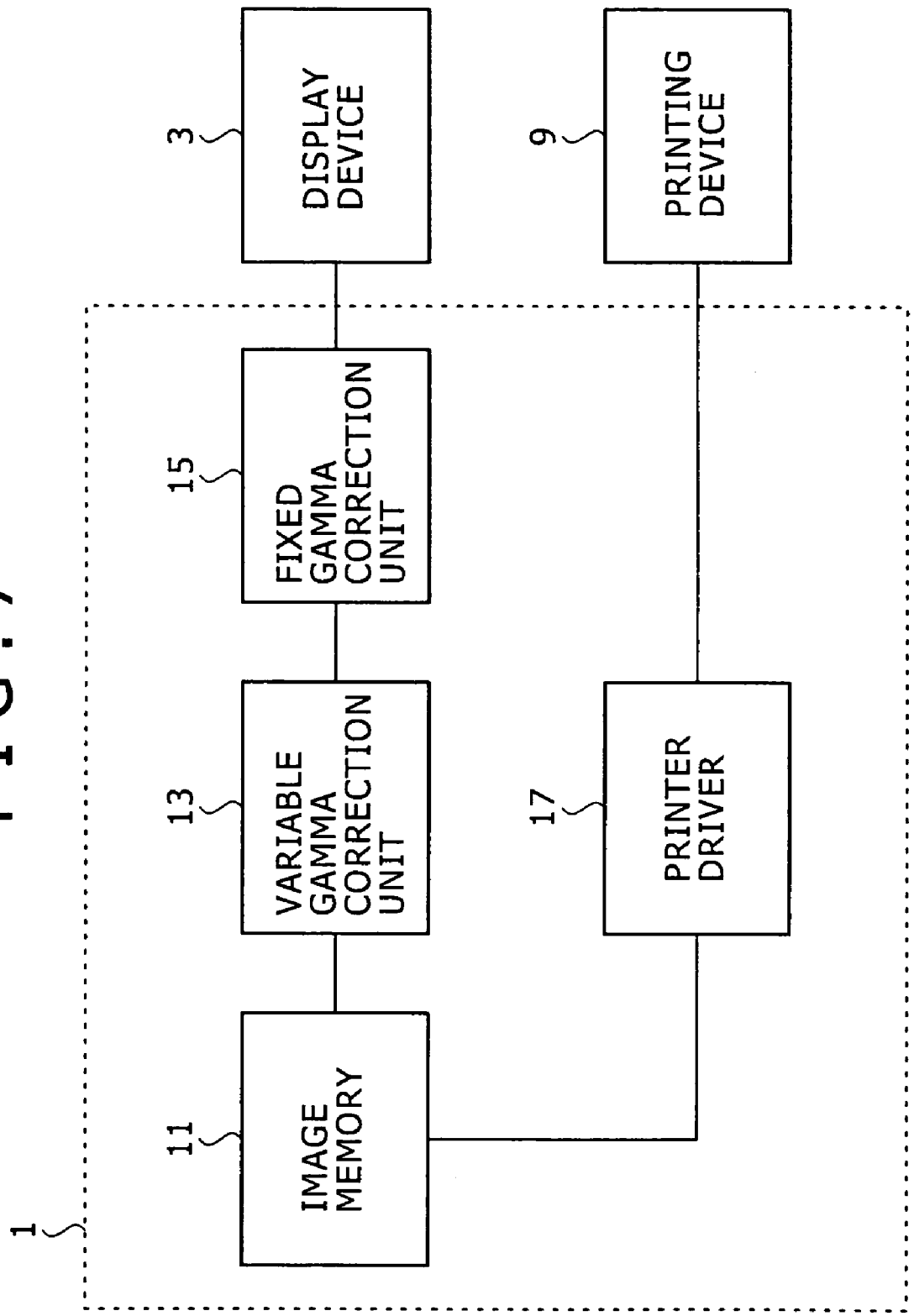
FIG. 7 is a diagram showing an example (conventional example) of internal configuration of an image printing system.
Figure 8:
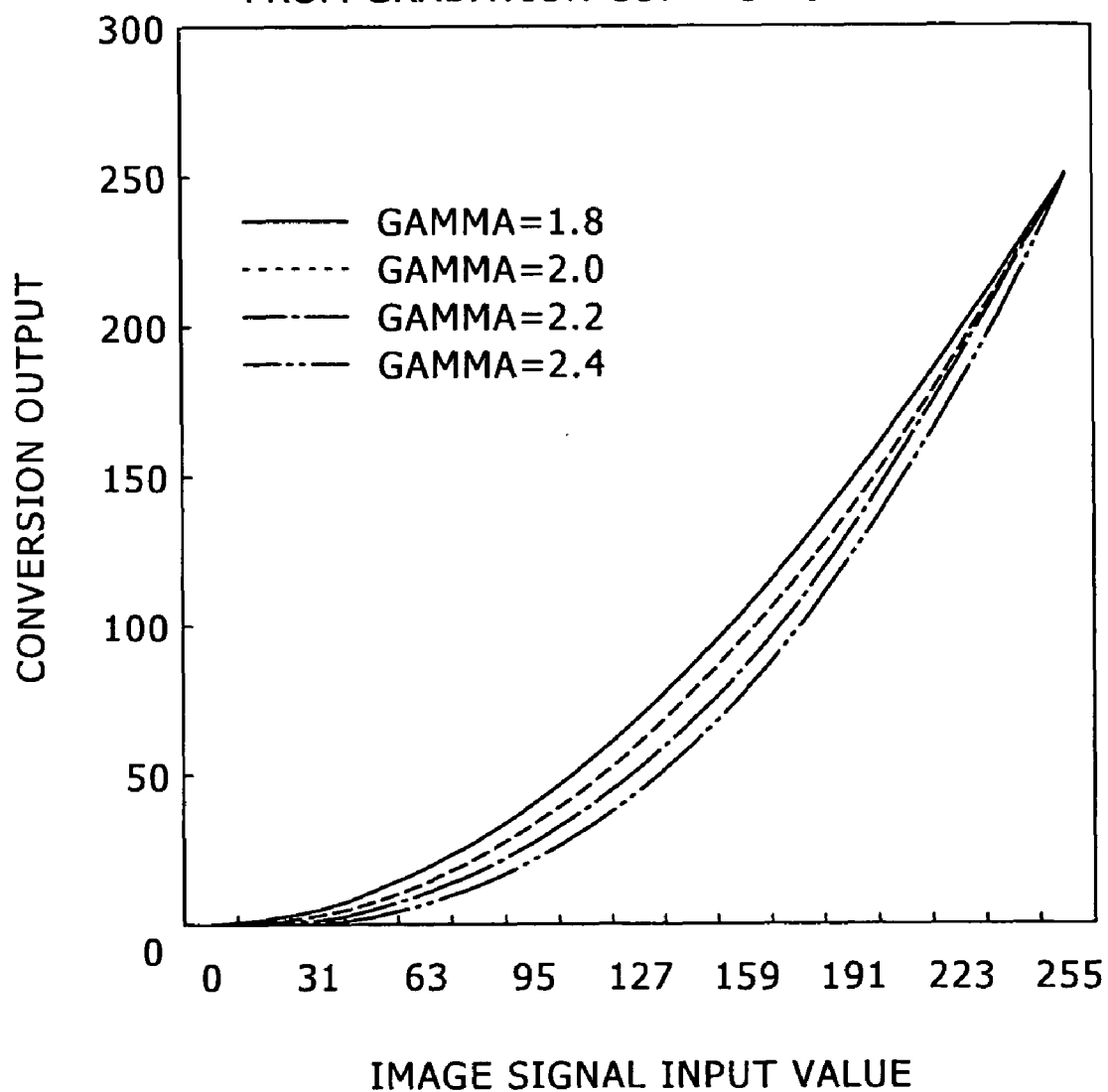
FIG. 8 is a diagram showing equivalent gamma curves of the image printing system as a whole.
Figure 9:
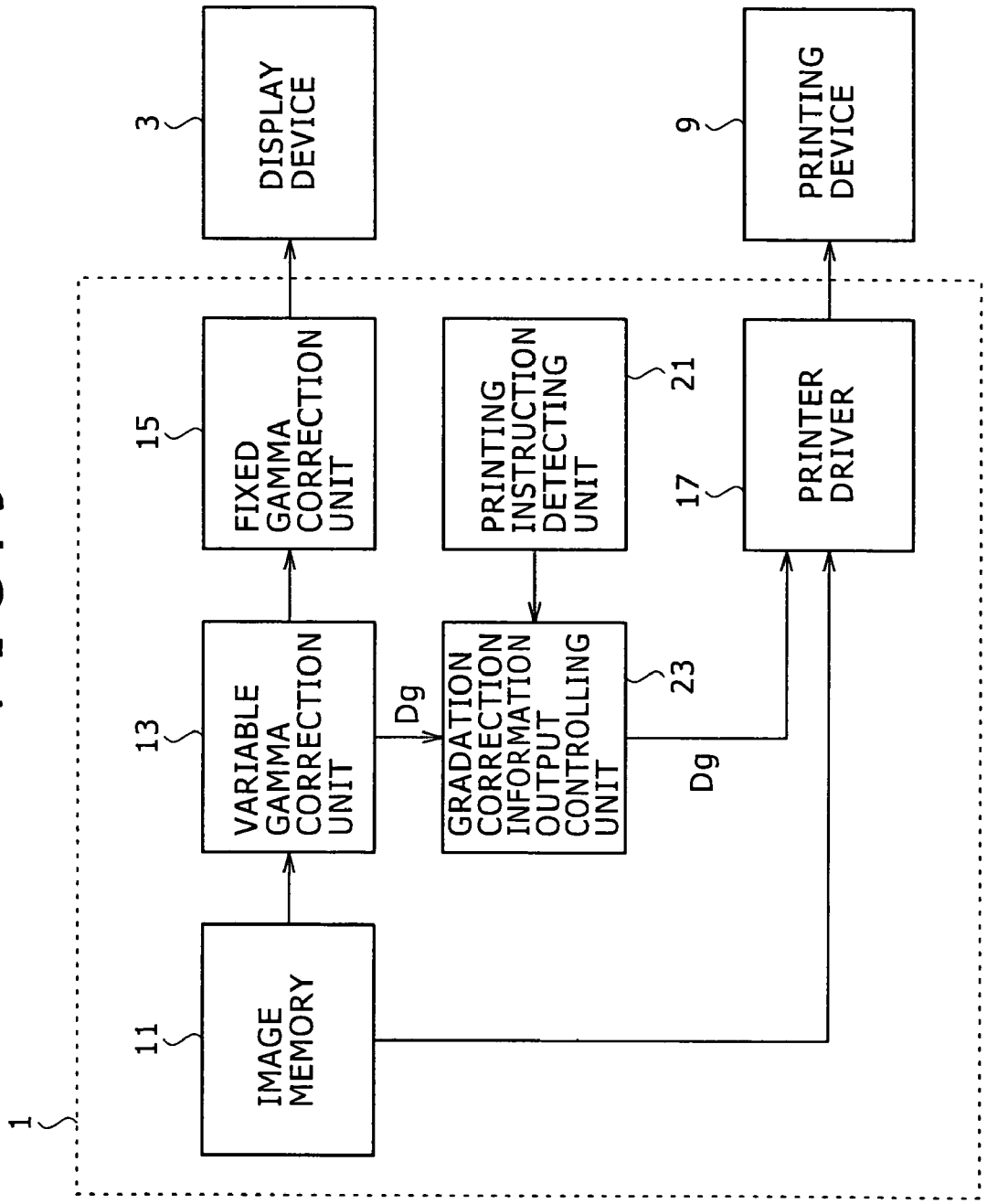
FIG. 9 is a diagram showing an example (embodiment) of internal configuration of an image printing system.

FIG. 9 shows an example of internal configuration of an image printing system (FIG. 1). This image processing device 1 includes an image memory 11, a variable gamma correction unit 13, a fixed gamma correction unit 15, a printer driver 17, a printing instruction detecting unit 21, and a gradation correction information output controlling unit 23.

The printing instruction detecting unit 21 is a processing device for detecting presence or absence of an instruction to print an observed image.

The gradation correction information output controlling unit 23 is a processing device for outputting gradation correction information Dg temporarily added for observation of the observed image by the variable gamma correction unit 13 when the printing instruction is detected. Incidentally, the gradation correction information Dg is output to a printing device 9 via the printer driver 17.

In this embodiment, the gradation correction information Dg is given as selecting information for specifying one of four kinds of gamma correction. Incidentally, when gamma correction is not performed in the variable gamma correction unit 13, insignificant data (for example zero) is used as the gradation correction information Dg.

The printer driver 17 is a processing device that supplies original image data and the gradation correction information Dg of the observed image to the printing device 9. Incidentally, the original image data of the observed image is read from the image memory 11.

Figure 10A:
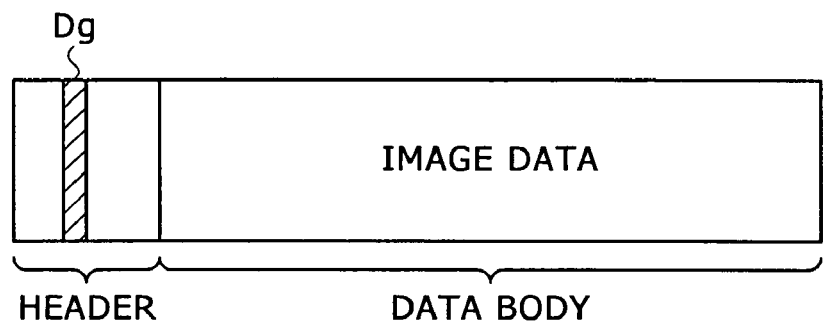
FIGS. 10A, 10B, and 10C are diagrams showing examples of a file format used to notify gradation correction information.
Figure 10B:
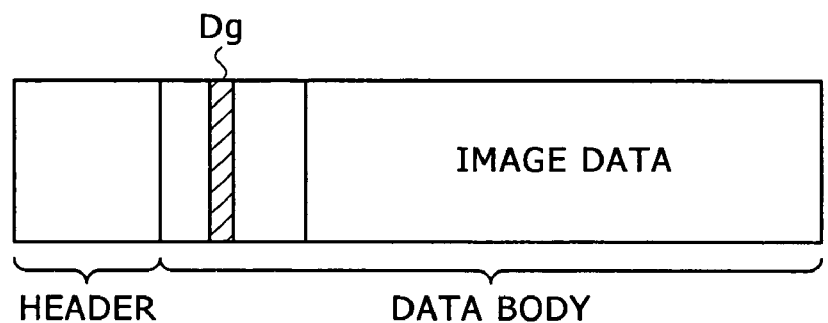
Figure 10C:
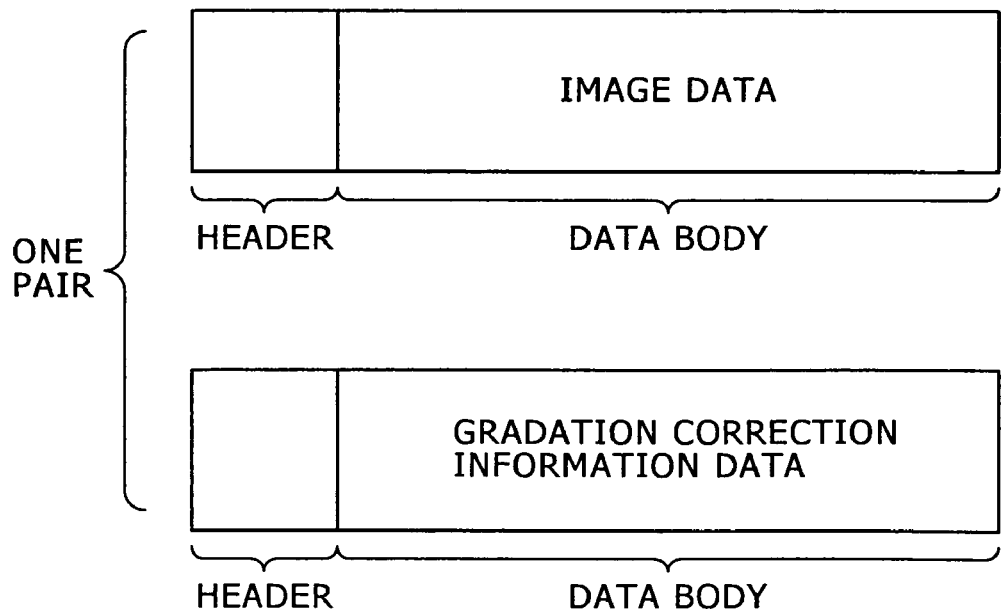

At this time, the printer driver 17 supplies the gradation correction information Dg, which is paired with the original image data, to the printing device 9 by methods represented in FIGS. 10A, 10B, and 10C or other methods.

FIG. 10A represents a method of notifying the gradation correction information Dg using a user-defined field within a header prepared in some of existing file formats.

FIG. 10B is an example when a new file format is defined in which areas for recording at least the gradation correction information Dg and the original image data are provided in a data body. In this case, however, a reproducing side needs to support this file format.

FIG. 10C is an example when a data file of the gradation correction information is defined which file has the same name as the file name of the original image data and has a different extension from that of the original image data.

(B) First Example of Printing Device (B-1) Configuration Example

Figure 11:
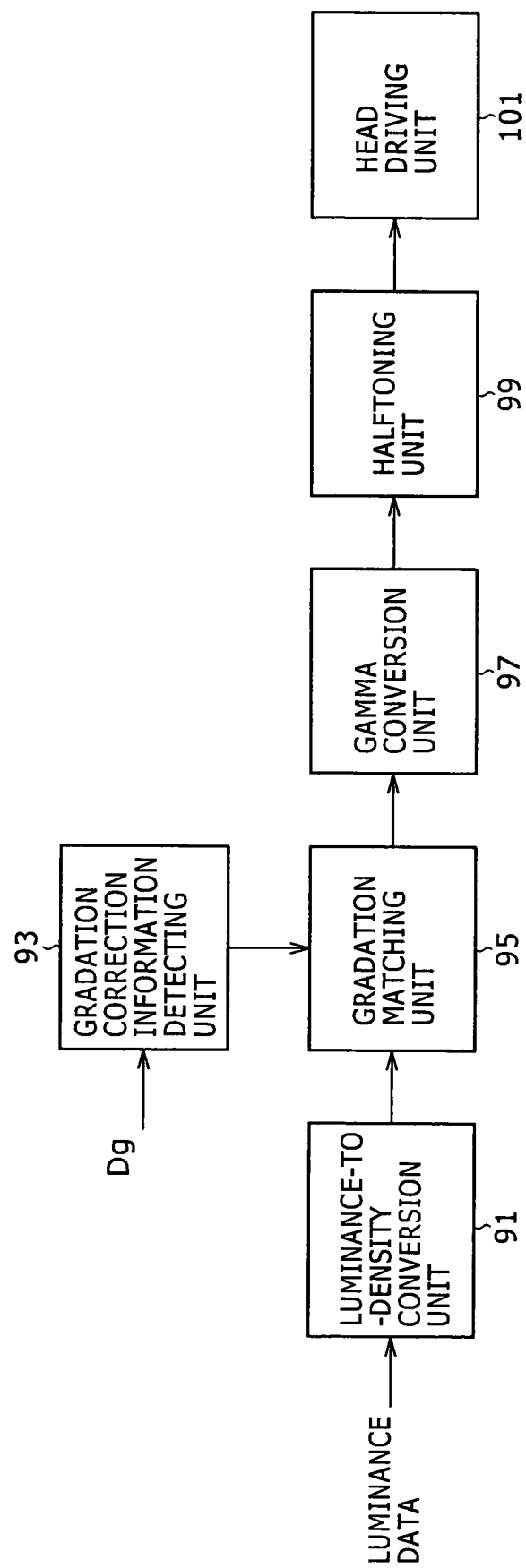
FIG. 11 is a diagram showing an example of internal configuration of a printing device.

FIG. 11 shows an example of internal configuration of the printing device 9. Description in the following will be made of a case where the printing device 9 employs an ink jet system as a printing system.

The printing device 9 includes a luminance-to-density conversion unit 91, a gradation correction information detecting unit 93, a gradation matching unit 95, a gamma conversion unit 97, a halftoning unit 99, and a head driving unit 101.

The luminance-to-density conversion unit 91 is a processing device that converts printing data to density data.

When printing data is a color image, the luminance-to-density conversion unit 91 converts primary-color data (RGB 24 bits) into color data (YMCK 32 bits) for a printing process system. Already known techniques are used for this conversion process. Specifically, LOG conversion, a masking process, and a UCR/BG process are applied. Generally, a three-dimensional look-up table is used.

When printing data is a monochrome image, the luminance-to-density conversion unit 91 inverts luminance data and thereby converts the luminance data into density data.

The gradation correction information detecting unit 93 is a processing device that detects presence or absence of the gradation correction information Dg input together with the original image data. That is, the gradation correction information detecting unit 93 determines presence or absence of information on gradation correction temporarily added for observation of the observed image. When the gradation correction information Dg is not present, or the gradation correction information Dg is insignificant data, the gradation correction information detecting unit 93 supplies the gradation matching unit 95 with information indicating that the gradation correction information Dg is not present or the gradation correction information Dg is insignificant data.

The gradation matching unit 95 is a processing device that matches the gradation of a printing image to the gradation of the observed image when significant gradation correction information Dg is given.

Figure 12:
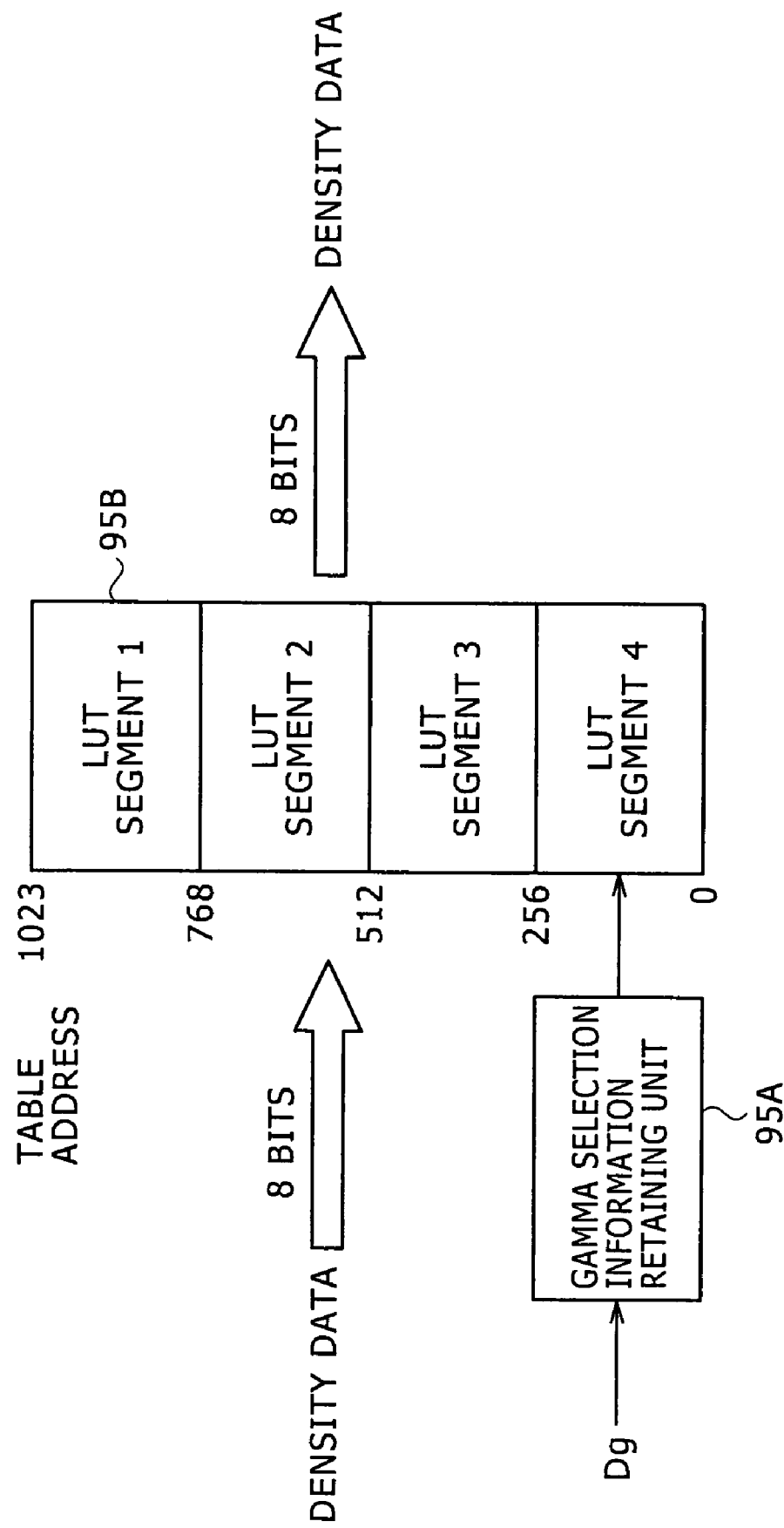
FIG. 12 is a diagram showing an example of configuration of a gradation matching unit.

FIG. 12 shows an example of internal configuration of the gradation matching unit 95. In this example, the gradation matching unit 95 includes a gamma selection information retaining unit 95A and a look-up table 95B. Of these parts, the look-up table 95B stores gamma conversion data corresponding to gamma corrections (gamma curves) used for observation on the image processing device side. In this example, four kinds of gamma conversion data are stored in four divided segments.

The four segments store the gamma conversion data that has inverse characteristics to those retained in the variable gamma correction unit 13 of the image processing device 1. This is because a luminance value and a density value of an image signal are in inverse relation to each other, and in density reproduction by a printer, a darker (denser) reproduction is made as the signal value is increased. For example, when a gamma value in the variable gamma correction unit 13 of the image processing device 1 is 1/1.2, a gamma value used in the look-up table 95B is 1.2.

The gamma selection information retaining unit 95A is a storage device that retains gamma conversion data selecting information based on the gradation correction information Dg. That is, data specifying the use of one of the four segments is recorded in the gamma selection information retaining unit 95A.

Incidentally, when custom-set gamma conversion data is used, a segment for custom setting is specified, and gamma conversion data corresponding to the gradation correction information supplied from the image processing device side is written to the area.

When the gradation correction information Dg is insignificant data, or when the gradation correction information Dg is not added, the gradation matching unit 95 outputs the density data input to the gradation matching unit 95 to the gamma conversion unit 97 in a succeeding stage as it is. This process can be realized by detouring an input to the look-up table 95B. It suffices to incorporate an input-output selector switch, for example.

The gamma conversion unit 97 is a signal processing unit that corrects the density data such that density is reproduced linearly in a printed image.

Figure 13:
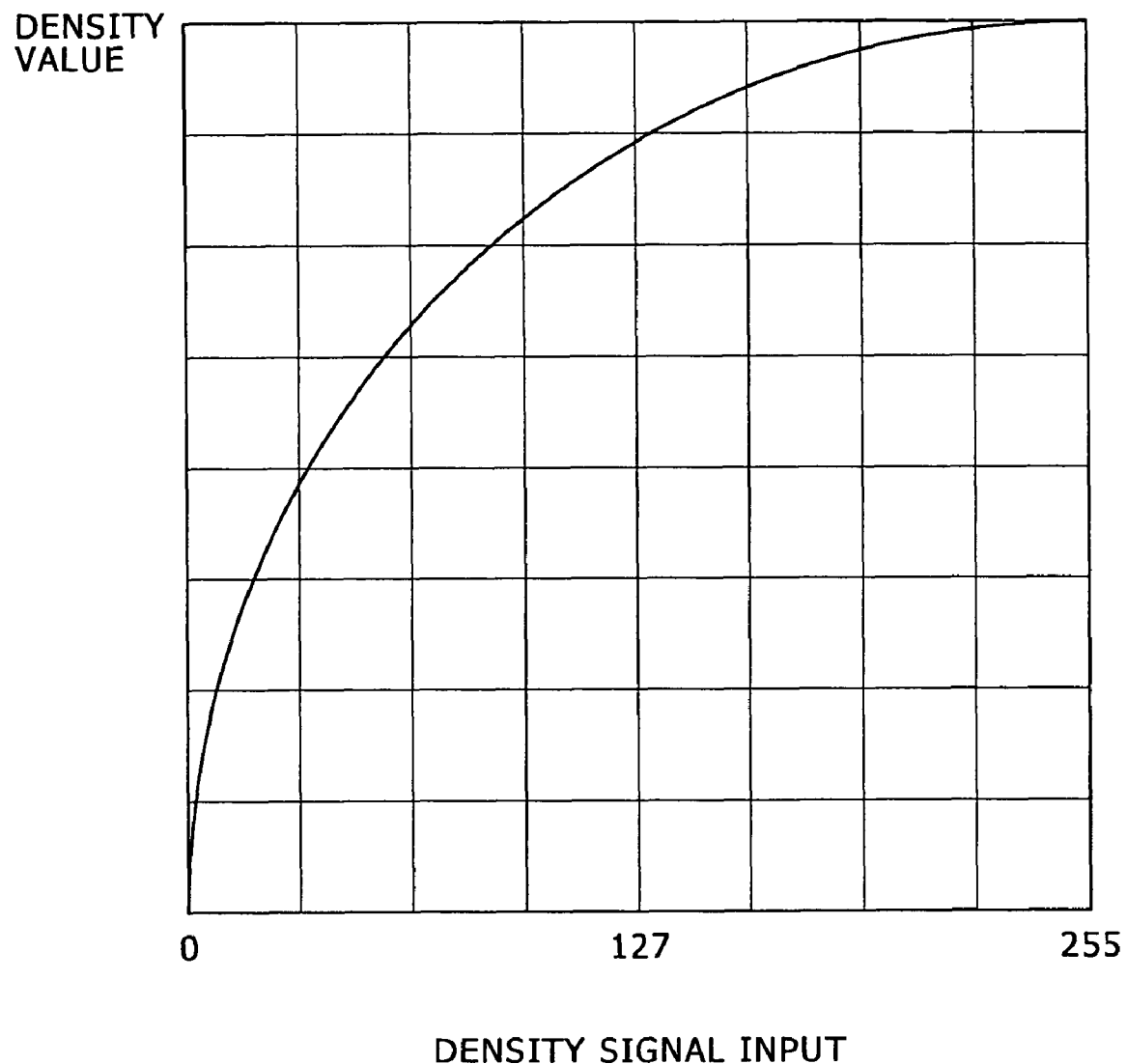
FIG. 13 is a diagram showing an example of a gamma characteristic specific to the printing device.

FIG. 13 shows an example of a gamma characteristic specific to the printing device 9. The printing device 9 has a characteristic in which a reproduced density value becomes saturated as the density value becomes higher (darker). Incidentally, the gamma characteristic is determined according to a combination of the type of a recorded medium, the permeability of ink in the recorded medium, the density of the ink, and the like. The gamma conversion unit 97 corrects the gamma characteristic specific to the printing device 9 including the recorded medium by an inverse characteristic.

The halftoning unit (error diffusing unit) 99 is a processing device that reduces the number of gradation levels of the multivalued and multilevel density data, and thereby converts the density data into a data format suitable for a PNM driving system. N-valued data after the conversion will herein be referred to as nozzle driving data. Incidentally, n corresponds to the number of representable gradation levels. Hence, a maximum number of ink drops forming one pixel is given as n-1. In this embodiment, suppose that the maximum value of n is four.

In the conversion into the nozzle driving data, the halftoning unit (error diffusing unit) 99 performs an error diffusion process.

The error diffusion process is performed to improve apparent gradation by diffusing a quantization error occurring when continuous-tone density data is converted into limited gradation values into a front pixel. The front pixel refers to a succeeding pixel in time series.

The nozzle driving unit 101 is a processing device that controls an operation of discharging ink drops. The nozzle driving unit 101 controls the operation of discharging ink drops by a print head on the basis of the nozzle driving data supplied separately for each color.

(B-2) Printing Process

A printing operation process by the printing device 9 will be described. The printing device 9 is characterized by including a function of matching the gradation reproducibility of the observed image with that of the printed image. That is, density gradation in the printed image is corrected by an amount by which luminance gradation in the observed image is corrected, and then printing is performed.

For example, when the observed image is corrected to be brighter, the printing device 9 makes a correction so as to decrease printing density. When the observed image is corrected to be darker, the printing device 9 makes a correction so as to increase printing density.

Information indicating a degree of correction made on the observed image side is the gradation correction information Dg. The printing device 9 specifies the gamma conversion data used in a printing process on the basis of the gradation correction information Dg supplied together with the original image data. That is, the printing device 9 specifies a segment in the look-up table 95B of the gradation matching unit 95.

Figure 14:
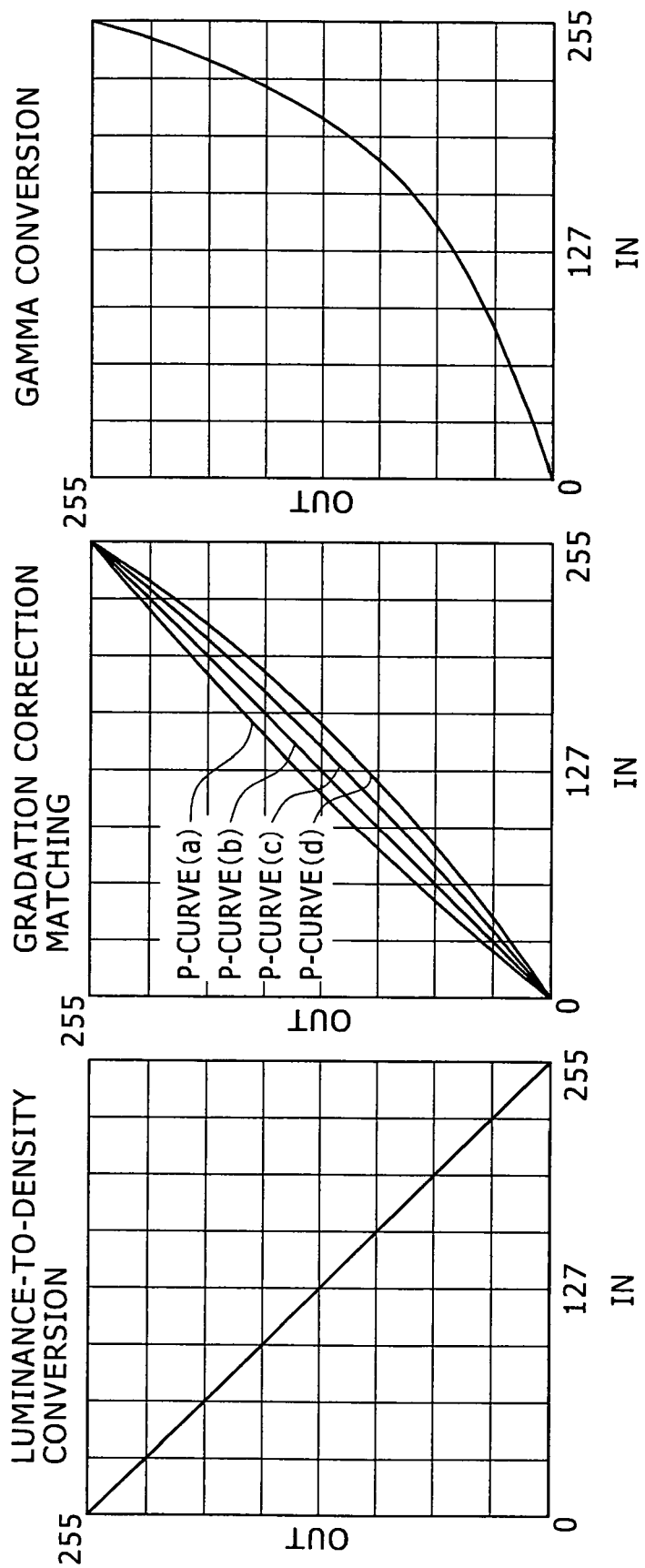
FIGS. 14A, 14B, and 14C are characteristic curve diagrams corresponding to conversion processes performed in the printing device.

FIGS. 14A, 14B, and 14C represent main conversion processes performed in the printing device 9.

FIG. 14A represents a conversion process performed in the luminance-to-density conversion unit 91. This conversion process converts a maximum luminance value (255) to a minimum density (0). Also, the conversion process converts a minimum luminance value (0) to a maximum density (255).

FIG. 14B represents a conversion process performed in the gradation matching unit 95. This conversion process converts the original image data converted into density data using one of characteristic curves P-Curves (a) to (d). In this example, the printed image is densest (darkest) when P-Curve (a) is selected, and the printed image becomes thinner (brighter) in order of P-Curve (b), P-Curve (c), and P-Curve (d).

FIG. 14C represents a conversion process performed in the gamma conversion unit 97. This conversion process corrects the gamma characteristic specific to the printing device 9, so that gradation levels given by the density data are reproduced faithfully.

(B-3) Effect

When an image printing system is constructed by combining the image processing device 1 and the printing device 9 described above, gradation correction made to the observed image can be reflected in the printed image. That is, it is possible to check the image with the same gradation representation as at the time of observation anytime.

In addition, the image processing device 1 does not alter the original image data, and thus compatibility of information between the image processing device 1 and other devices can be ensured.

(C) Second Example of Printing Device (C-1) Configuration Example

Figure 15:
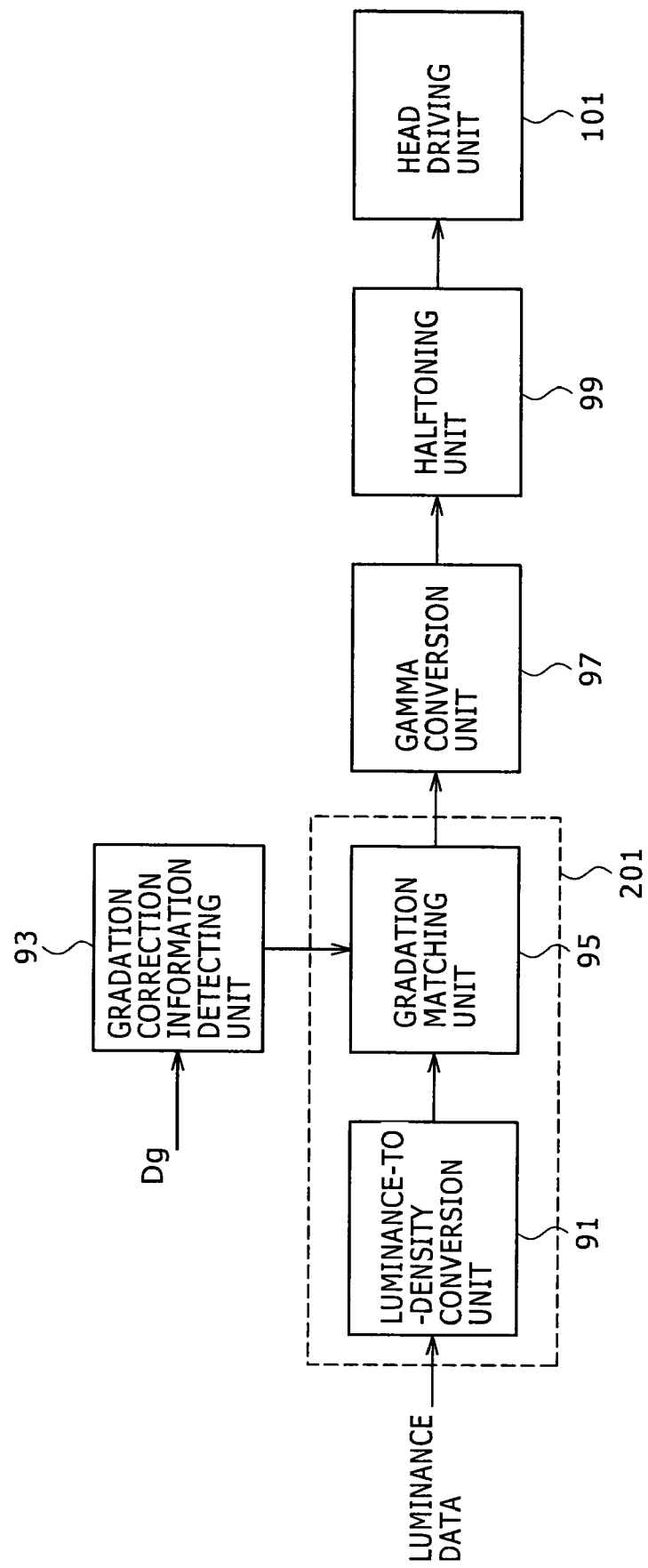
FIG. 15 is a diagram showing another example of internal configuration of a printing device.

FIG. 15 shows another example of internal configuration of a printing device 9. Also in this case, suppose that the printing device 9 employs an ink jet system as a printing system.

The basic configuration of this example of the printing device is the same as the first example of the printing device. The second example of the printing device differs from the first example of the printing device only in that the functions of the luminance-to-density conversion unit 91 and the gradation matching unit 95 are integrated into one in the second example of the printing device. This is realized by a look-up table 201 in which the two functions are integrated.

Figure 16:
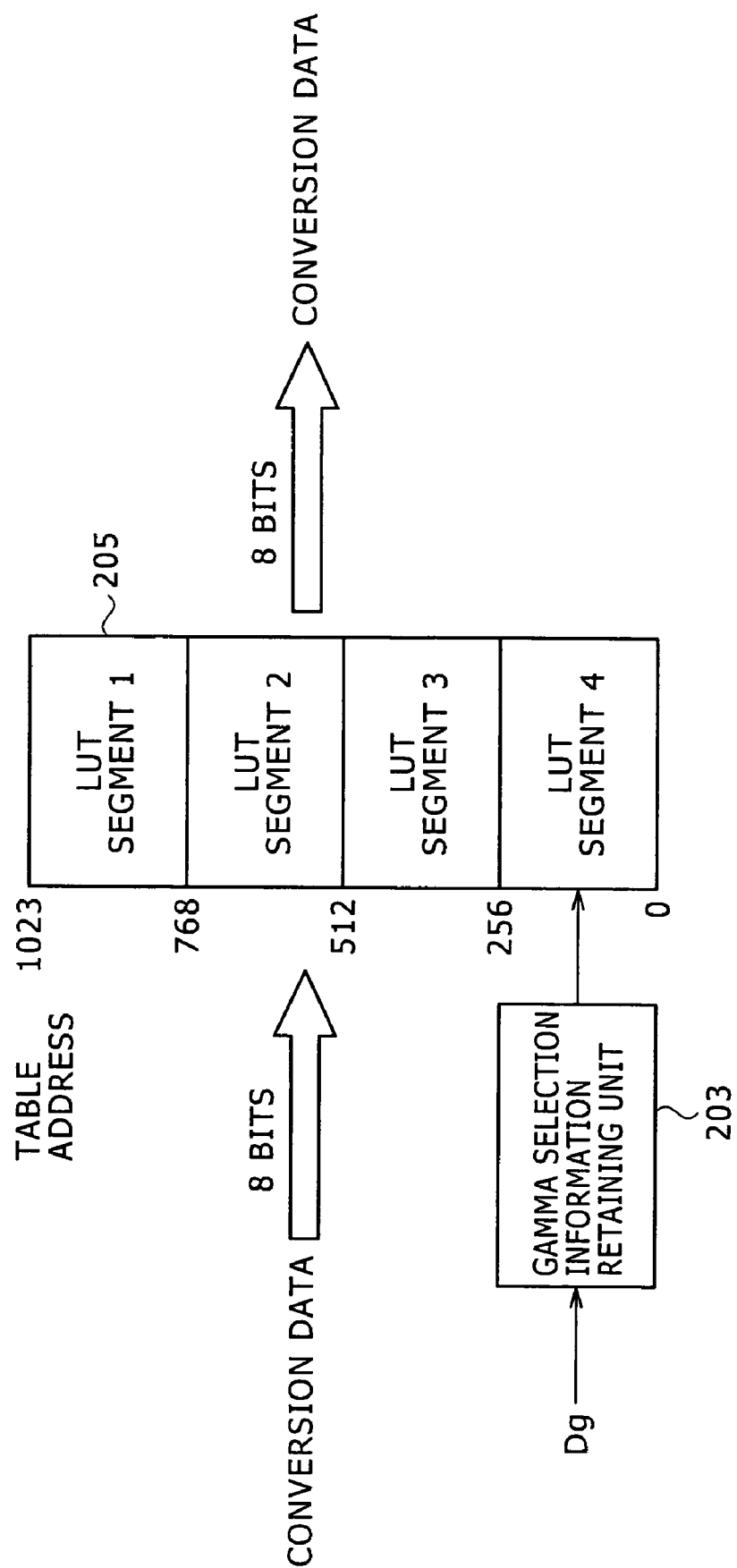
FIG. 16 is a diagram showing an example of internal configuration of a look-up table.

FIG. 16 shows an internal configuration of the look-up table 201. The look-up table 201 is basically the same as the internal configuration of the gradation matching unit 95 shown in FIG. 12. That is, the look-up table 201 includes a gamma selection information retaining unit 203 and an integrated look-up table 205. Of these parts, the integrated look-up table 205 stores gamma conversion data in which an input-output relation for luminance-to-density conversion and an input-output relation for gradation correction matching are integrated with each other. In this example, four kinds of gamma conversion data are stored in four divided segments.

The gamma selection information retaining unit 203 is a storage device that retains gamma conversion data selecting information based on gradation correction information Dg. That is, data specifying the use of one of the four segments is recorded in the gamma selection information retaining unit 203.

(C-2) Printing Process and Effect

Figure 17B:
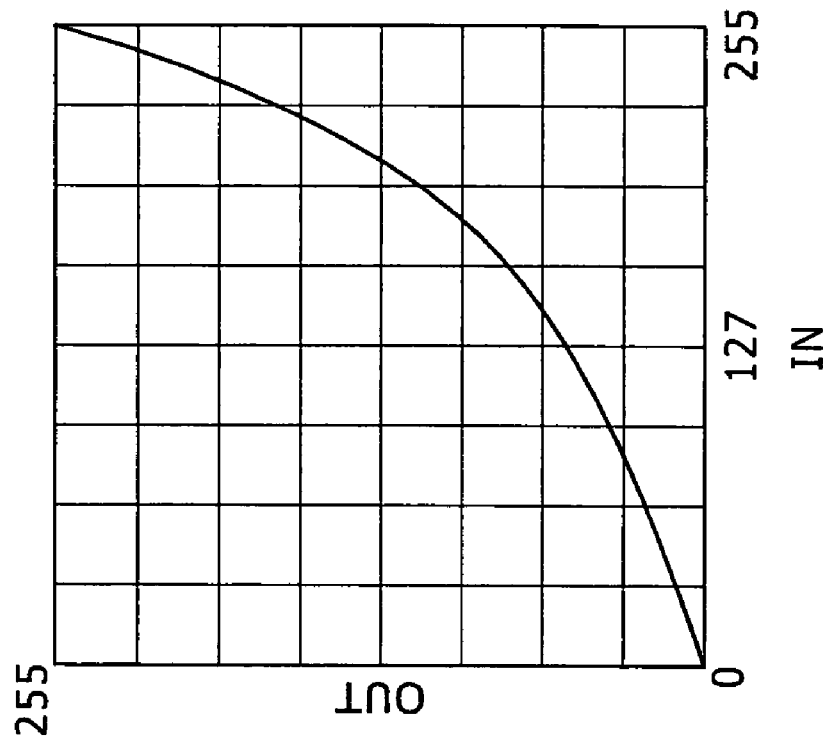
FIGS. 17A and 17B are characteristic curve diagrams corresponding to conversion processes performed in the printing device.
Figure 17A:
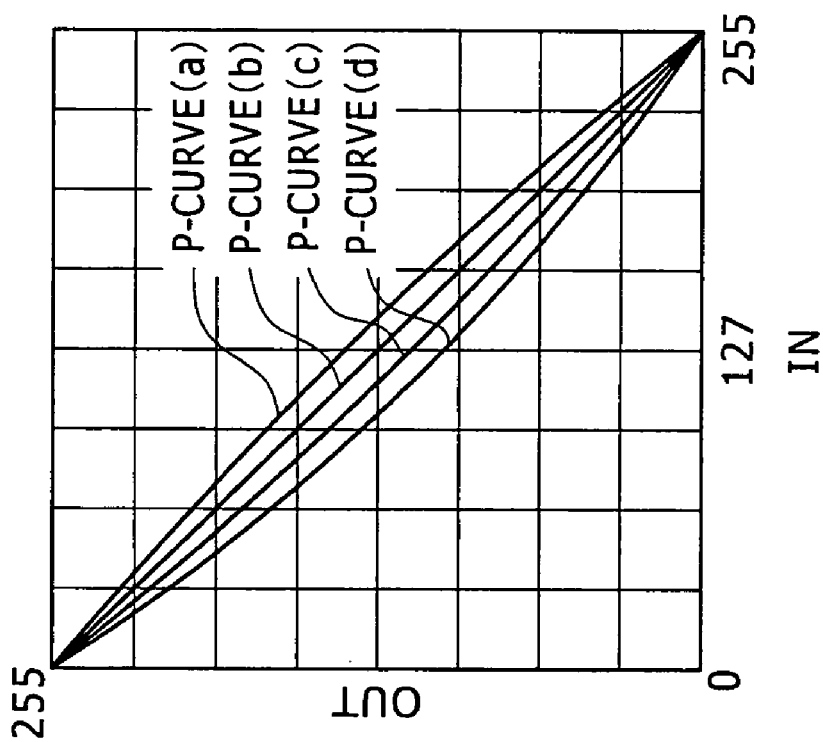

FIGS. 17A and 17B represent main conversion processes performed in the printing device.

FIG. 17A corresponds to a conversion process performed in the look-up table 201. The look-up table 201 represents input-output relations obtained by integrating luminance-to-density conversion and gradation correction with each other. Therefore characteristic curves P-Curves (a) to (d) are given as input-output relations with a luminance-to-density conversion characteristic as a basic characteristic. That is, a maximum luminance value (255) is converted to a minimum density (0). Also, this conversion process converts a minimum luminance value (0) to a maximum density (255).

FIG. 17B represents a conversion process performed in a gamma conversion unit 97. This conversion process corrects a gamma characteristic specific to the printing device 9, so that gradation levels given by density data are reproduced faithfully.

As described above, also in this configuration example, gradation correction made to the observed image can be reflected in the printed image.

(D) Third Example of Printing Device
(D-1) Configuration Example

Figure 18:
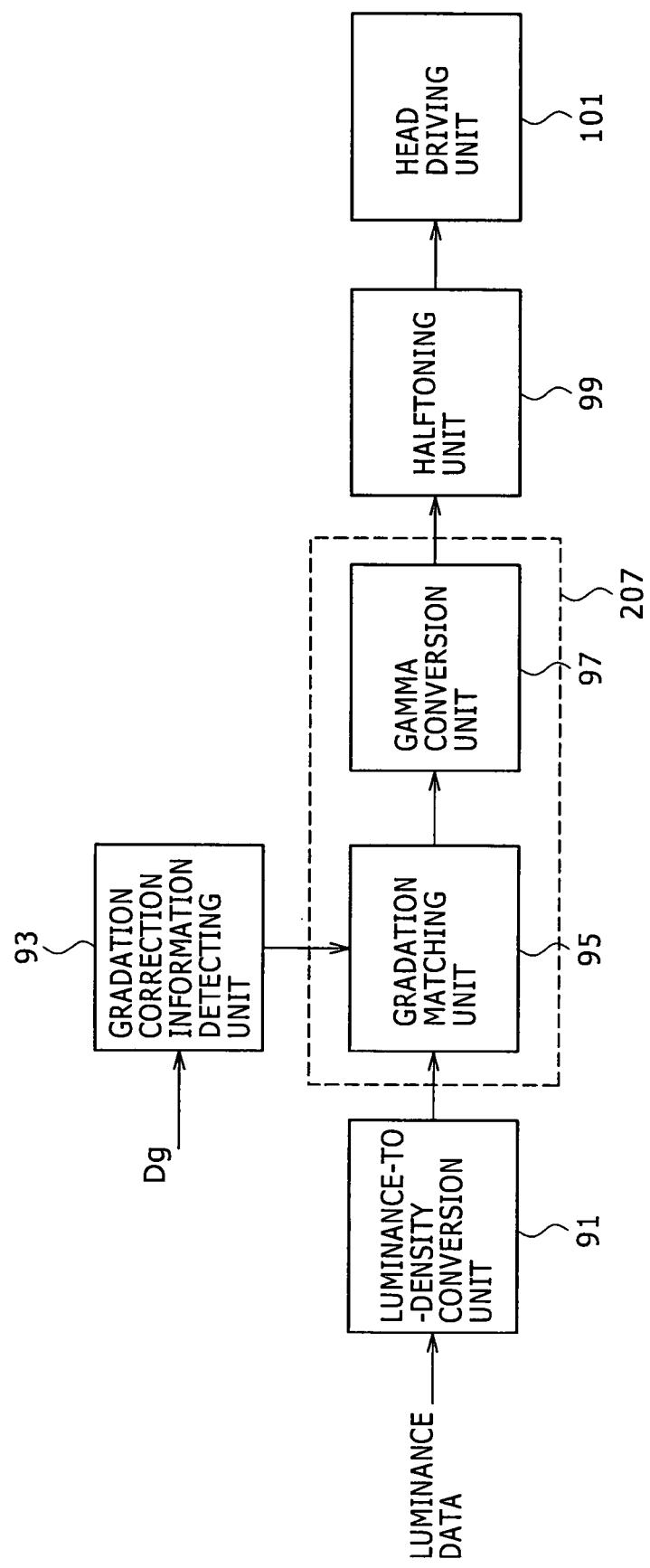
FIG. 18 is a diagram showing another example of internal configuration of a printing device.

FIG. 18 shows another example of internal configuration of a printing device 9. Also in this case, suppose that the printing device 9 employs an ink jet system as a printing system.

The basic configuration of this example of the printing device is the same as the first example of the printing device. The third example of the printing device differs from the first example of the printing device only in that the functions of the gradation matching unit 95 and the gamma conversion unit 97 are integrated into one in the third example of the printing device. This is realized by a look-up table 207 in which the two functions are integrated.

The configuration of the look-up table 207 is the same as in FIG. 16. That is, the look-up table 207 is the same as the look-up table 201. However, input data to be converted by the look-up table 207 is density data after luminance-to-density conversion. Output data after conversion by the look-up table 207 is density data after gamma correction.

(D-2) Printing Process and Effect

FIGS. 19A and 19B represent main conversion processes performed in the printing device.

FIG. 19A represents a conversion process performed in a luminance-to-density conversion unit 91. This conversion process converts a maximum luminance value (255) to a minimum density (0). Also, the conversion process converts a minimum luminance value (0) to a maximum density (255).

FIG. 19B corresponds to a conversion process performed in the look-up table 207. The look-up table 207 represents input-output relations obtained by integrating gradation correction and fixed gamma correction with each other. Therefore characteristic curves P-Curves (a) to (d) are given as input-output relations with a gamma curve as a basic characteristic. This conversion process can correct a gamma characteristic specific to the printing device 9, adding a correction of gradation of an observed image. That is, gradation levels given by density data can be reproduced faithfully.

As described above, also in this configuration example, gradation correction made to the observed image can be reflected faithfully in the printed image.

(E) Fourth Example of Printing Device
(E-1) Configuration Example

Figure 20:
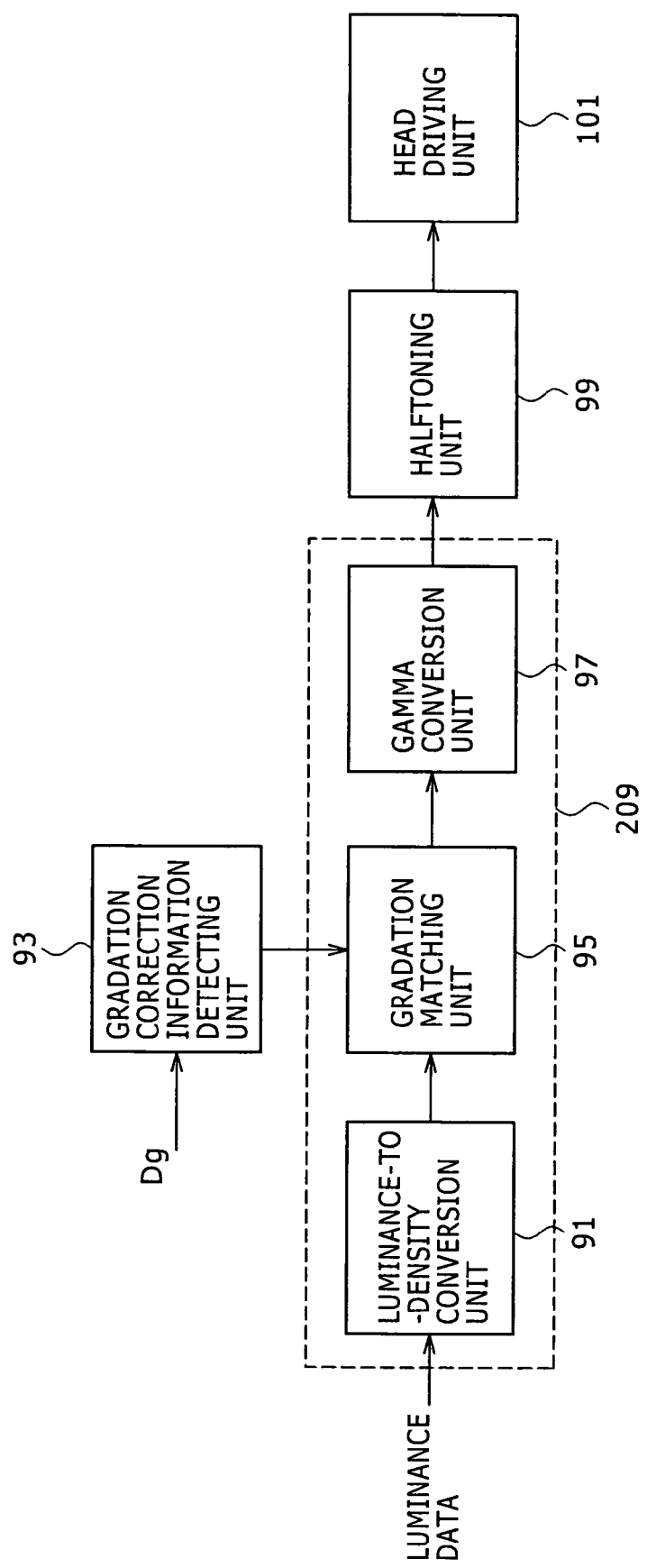
FIG. 20 is a diagram showing another example of internal configuration of a printing device.

FIG. 20 shows another example of internal configuration of a printing device 9. Also in this case, suppose that the printing device 9 employs an ink jet system as a printing system.

The basic configuration of this example of the printing device is the same as the first example of the printing device. The fourth example of the printing device differs from the first example of the printing device only in that the functions of the luminance-to-density conversion unit 91, the gradation matching unit 95, and the gamma conversion unit 97 are integrated into one in the fourth example of the printing device. This is realized by a look-up table 209 in which the three functions are integrated.

The configuration of the look-up table 209 is the same as in FIG. 16. That is, the look-up table 209 is the same as the look-up table 201. However, input data to be converted by the look-up table 209 is original image data before luminance-to-density conversion. Output data after conversion by the look-up table 209 is density data after gamma correction.

(E-2) Printing Process and Effect

Figure 21:
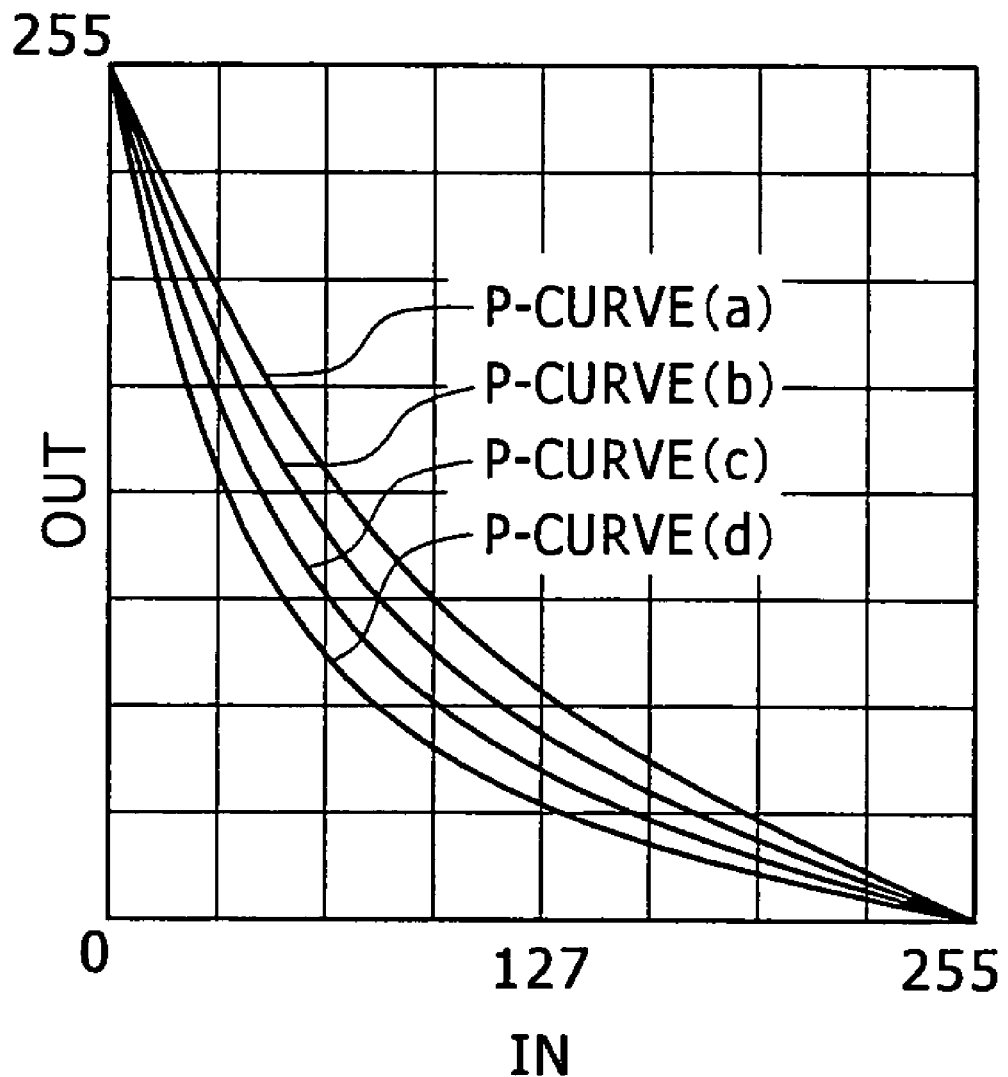
FIG. 21 is a characteristic curve diagram corresponding to conversion processes performed in the printing device.

FIG. 21 represents a main conversion process performed in the printing device.

FIG. 21 represents a conversion process performed in the look-up table 209. This conversion process converts a maximum luminance value (255) to a minimum density (0). Also, the conversion process converts a minimum luminance value (0) to a maximum density (255).

In this conversion process, characteristic curves P-Curves (a) to (d) are given as input-output relations with a luminance-to-density conversion characteristic and a gamma curve as a basic characteristic.

As described above, also in this configuration example, gradation correction made to the observed image can be reflected faithfully in the printed image.

(F) Other Embodiments (a) In the foregoing embodiments, an image processing device for processing an image for medical diagnosis is assumed. However, the image processing device is not limited to a special device optimized for medical diagnosis.

The image processing device includes for example general-purpose computers, video cameras, digital cameras, game consoles, scanners, portable information terminals (portable type computers, portable telephones, portable type game consoles, electronic books and the like), image reproducing devices (for example optical disk devices and home servers), and processing boards and processing cards in which functions according to the present invention are incorporated. The present invention is also applicable to multifunction devices incorporating the image processing function and the printing function.

Incidentally, any of the image processing devices is formed by combining a casing, a signal processing unit, and an external interface as common components with peripheral devices according to the form of the product. For example, a video camera or a digital camera has a camera unit and a writing circuit for storing picture data obtained by image pickup on a storage medium in addition to the above-described components.

For example, a portable telephone or another electronic device having a communication function has a transmitting and receiving circuit and an antenna in addition to the above-described components.

(b) In the foregoing embodiments, the ink jet system is employed as the printing system of the printing device 9. However, a laser system may be employed.

(c) In the foregoing embodiments, description has been made of a case where gradation correction information is selection information. However, the present invention is applicable to cases where a gamma value, look-up table data for specifying a gamma curve, a function for generating a gamma curve, and the like are given.

(d) Various modifications of the foregoing embodiments are conceivable without departing from the spirit of the invention. Various modifications and applications created on the basis of description in the present specification are also conceivable.

It should be understood by those skilled in the art that various modifications, combinations, sub-combinations and alterations may occur depending on design requirements and other factors insofar as they are within the scope of the appended claims or the equivalents thereof.

What is claimed is:

1. A printing control device associated with an image processing device, comprising:
    a gradation variation input which allows a user to modify a gradation of a displayed original image from an original gradation level to a first new gradation level in order to display modified image data, information sufficient to identify a difference between the original gradation level and the first new gradation level being stored as gradation difference data;
    a gradation correction information output control unit for outputting the gradation difference data corresponding to the displayed modified image along with original image data unaffected by the change in gradation to one of a printing device and an external storage medium when a printing instruction is detected; and
    further wherein the gradation difference data is used to alter at least one printing instruction parameter in order to print the original image data in a manner that exhibits the gradation variation of the displayed image as displayed based on the gradation variation input, the gradation difference data being used to determine a gamma characteristic which is also determined according to one or more of a permeability of ink in a recording medium, a density of ink and a type of recording medium, and further comprising means for determining when the gradation difference data is below a threshold in order to provide density data in an unaltered state by transferring the original image data via a signal transfer bypass if it is determined that the gradation difference data is below the threshold.

2. A printing control device included in a printing device, comprising:
    an input interface for receiving original image data and gradation difference data representing a change in gradation previously made to the original image data in order to generate an altered version of the original image data on a display screen; and
    further wherein the gradation difference data is used to alter at least one printing instruction parameter in order to print the original image data in a manner that exhibits the gradation variation of the displayed image as displayed based on the gradation difference data, the gradation difference data being used to determine a gamma characteristic which is also determined according to one or more of a permeability of ink in a recording medium, a density of ink and a type of recording medium and when the gradation difference data is below a threshold the density data is provided in an unaltered state by transferring the original image data via a signal transfer bypass if it is determined that the gradation difference data is below the threshold.

3. An image processing device for displaying an observed image on a display screen, comprising:
    a display screen for displaying an observed image having an original gradation level;
    a gradation variation input which allows a user to modify gradation of the observed image from the original gradation level to a first new gradation level, information sufficient to identify a difference between the original gradation level and the first new gradation level being stored as gradation difference data;
    a gradation correction information output control unit for outputting the gradation difference data made during observation of the observed image along with original image data of the observed image unaffected by the change in gradation to one of a printing device and an external storage medium when a printing instruction is detected; and
    further wherein the gradation difference data is used to alter at least one printing instruction parameter in order to print the original image data in a manner that exhibits the gradation variation of the displayed image as displayed based on the gradation variation input, the gradation difference data being used to determine a gamma characteristic which is also determined according to one or more of a permeability of ink in a recording medium, a density of ink and a type of recording medium, and further comprising means for determining when the gradation difference data below a threshold in order to provide density data in an unaltered state by transferring the original image data via a signal transfer bypass if it is determined that the gradation difference data is below the threshold.

4. A printing device comprising:
    an input interface for receiving original image data and gradation difference data representing a change in gradation made to the original image for displaying a modified version of the original image data via a display screen; and
    further wherein the gradation difference data is used to alter at least one printing instruction parameter in order to print the original image data in a manner that exhibits the gradation variation of the displayed image as displayed based on the gradation difference data, the gradation difference data being used to determine a gamma characteristic which is also determined according to one or more of a permeability of ink in a recording medium, a density of ink and a type of recording medium and when the gradation difference data is below a threshold the density data is provided in an unaltered state by transferring the original image data via a signal transfer bypass if it is determined that the gradation difference data is below the threshold.

5. A printing control method in an image processing device for displaying an image on a display screen, comprising:
    displaying an image having an original gradation level;
    varying the gradation of the displayed image from the original gradation level to a first new gradation level, information sufficient to identify a difference between the original gradation level and the first new gradation level being stored as gradation difference data;

outputting the gradation difference data along with the original image data unaffected by the change in gradation to one of a printing device and an external storage medium when a printing instruction is detected; and further wherein the gradation difference data is used to alter at least one printing instruction parameter in order to print the original image data in a manner that exhibits the gradation variation of the displayed image as displayed based on the gradation difference data, the gradation difference data being used to determine a gamma characteristic which is also determined according to one or more of a permeability of ink in a recording medium, a density of ink and a type of recording medium and when the gradation difference data is below a threshold, the density data is provided in an unaltered state by transferring the original image data via a signal transfer bypass if it is determined that the gradation difference data is below the threshold.

6. A printing control method in a printing device, comprising the steps of:

receiving original image data and gradation difference data representing a change in gradation previously made to the original image via a display screen; and further wherein the gradation difference data is used to alter at least one printing instruction parameter in order to print the original image data in a manner that exhibits the gradation variation of the displayed image as displayed based on the gradation difference data, the gradation difference data being used to determine a gamma characteristic which is also determined according to one or more of a permeability of ink in a recording medium, a density of ink and a type of recording medium, and when the gradation difference data is below a threshold, the density data is provided in an unaltered state by transferring the original image data via a signal transfer bypass if it is determined that the gradation difference data is below the threshold.

7. A program embodied in a computer readable medium stored in a non-transitory electronic memory which when executed by a processor performing:

displaying an observed image having an original gradation level;

varying the gradation of the observed image from the original gradation level to a first new gradation level, information sufficient to identify a difference between the original gradation level and the first new gradation level being stored as gradation difference data;

outputting the gradation difference data made during observation of the observed image along with original image data of the observed image unaffected by the change in gradation to one of a printing device and an external storage medium when a printing instruction is detected; and further wherein the gradation difference data is used to alter at least one printing instruction parameter in order to print the original image data in a manner that exhibits the gradation variation of the displayed image as displayed based on the gradation difference data, the gradation difference data being used to determine a gamma characteristic which is also determined according to one or more of a permeability of ink in a recording medium, a density of ink and a type of recording medium, and further comprising means for providing the original image data in an unaltered state when the gradation difference data is below a threshold by transferring the original image data via a signal transfer bypass if it is determined that the gradation difference data is below the threshold.

8. The printing control device according to claim 2, further comprising a luminance to density conversion unit for converting luminance data into density data suitable for printing and a gamma conversion unit for modifying gamma characteristics of the image in a predetermined manner specific to the printing device characteristics including at least one attribute selected from the group including a type of printing medium, density of an ink used to form an image, and permeability of an ink used to form an image.

9. The printing control device according to claim 8, wherein said gradation matching unit includes a lookup table for applying the modified gradation difference data to the original image.

10. The printing control device according to claim 9, wherein said lookup table is modified to incorporate both the gradation matching unit function and the luminance to density conversion unit function via a single lookup table.

11. The printing control device according to claim 9, wherein said lookup table is modified to incorporate both the gradation matching unit function and gamma conversion unit function via a single lookup table.

12. The printing control device according to claim 9, wherein said lookup table is modified to incorporate the gradation matching unit function, gamma conversion unit function, and luminance-to-density conversion unit function via a single lookup table.

13. The printing control method according to claim 6, further comprising:

a density conversion step step of converting luminance data into density data suitable for printing; and a gamma conversion step of modifying gamma characteristics of the image in a predetermined matter specific to the printing device characteristics including at least one attribute selected from the group including a type of printing medium, density of an ink used to form an image, and permeability of an ink used to form an image.

14. The printing control device according to claim 13, wherein said matching step includes utilizing a lookup table for applying the modified gradation difference data to the original image.

15. The printing control device according to claim 14, wherein said lookup table is modified to incorporate both the matching step and the luminance to density conversion step via a single lookup table.

16. The printing control device according to claim 14, wherein said lookup table is modified to incorporate both the matching step and the gamma conversion step via a single lookup table.

17. The printing control device according to claim 14, wherein said lookup table is modified to incorporate the matching step, gamma conversion step, and luminance-to-density conversion step via a single lookup table.

* * * * *